Sept. 22, 1964 W. S. HARRIS 3,149,458
JET ENGINE PROCESS USING HYDROGEN PRODUCED FROM
METAL-HYDROCARBON MIXTURE AND WATER
Filed Nov. 1, 1962
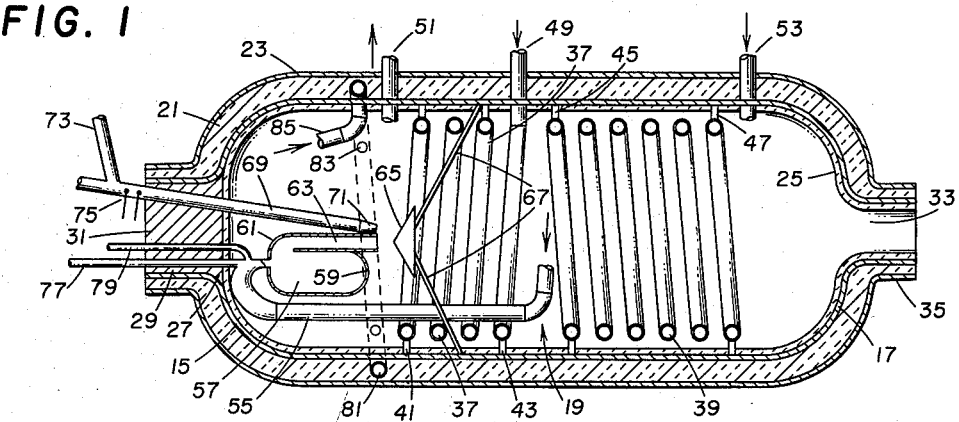
FIG. 1
FIG. 4
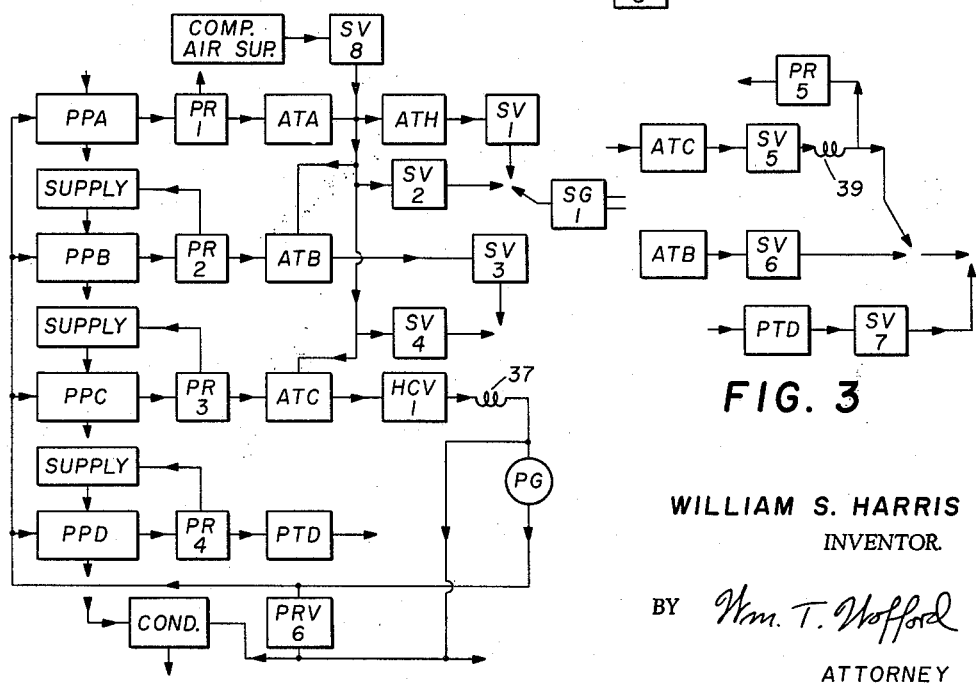
FIG. 2
FIG. 3
WILLIAM S. HARRIS
INVENTOR.
BY Wm. T. Wofford
ATTORNEY United States Patent Office 3,149,458
Patented Sept. 22, 1964

3,149,458
JET ENGINE PROCESS USING HYDROGEN PRODUCED FROM METAL-HYDROCARBON MIXTURE AND WATER
William S. Harris, 911 Lynda Lane, Arlington, Tex.
Filed Nov. 1, 1962, Ser. No. 234,697
8 Claims. (Cl. 60—35.4)

My invention relates to jet engines and more particularly to unaspirated jet engines.

Engines of the internal combustion type have been most generally used in the past and even now to power aircraft. These engines, as is well known, burn a mixture of a hydrocarbon fuel and air. The gas pressure developed thereby moves pistons or turbines connected to one or more propellers, or produces a reactive forward thrust. Because these internal combustion type engines depend upon air for combustion of the fuel, it is recognized that their capabilities are limited at higher altitudes where the air is rarefied. So far it has been found impractical to carry, as part of the load aboard such aircraft, sufficient oxygen, or other substance, that will aid combustion and produce more power at the higher altitudes. There has developed, therefore, a need for an unaspirated engine; one that does not depend upon air in order to develop its fullest capabilities. Such an engine would be readily adaptable for use in an aircraft that is otherwise capable of flying at practically any altitude, but is presently limited because of the type of engines available.

Accordingly, it is the general object of the present invention to provide an improved jet-type engine that is not dependent upon air for the development of power.

Another object of the invention is to provide an improved unaspirated jet-type engine that develops power from internal chemical reactions.

In accordance with the principles of my invention, an unaspirated jet-type engine includes a generally tubular casing, a front end closure member and a rear end closure member, which, together, define a chemaction chamber. The rear end closure member has a rearwardly disposed axial thrust opening. Within the chemaction chamber there is provided a mixing chamber having inlet and outlet openings. Fluid conduits connect such inlet opening with a basic fuel supply and a supply of steam. The basic fuel and steam mix in the mixing chamber; the basic fuel being partially volatilized and reacting partially with the steam. Upon emerging from the mixing chamber, the steam and basic fuel impinge upon a previously heated diffuser-igniter plate and complete their reaction, producing hydrogen gas and an oxide of metal. A controllable quantity of oxygen is thereafter introduced into the chemaction chamber, and the oxygen reacts with the hydrogen to develop heat and other gases which emerge from the rearwardly disposed axial opening. An imbalance of internal forces results which produces a forward thrust.

For a further understanding of my invention and further objects and advantages thereof, reference may be made to the following description taken in conjunction with the accompanying drawing in which:

FIG. 1 is a schematic longitudinal sectional view of the engine in accordance with a preferred embodiment of my invention;

FIG. 2 is a schematic diagram of a portion of the power system of the engine in accordance with a preferred embodiment of my invention;

FIG. 3 is a schematic diagram of another portion of the power system of the engine in accordance with a preferred embodiment of my invention; and FIG. 4 is a schematic diagram of electrical controls pertaining to the system of FIG. 2.

Referring now to FIG. 1, an engine 11 comprises a cylindrical casing 13, having a longitudinal axis. The front end of the casing 13 is closed by a front end closure head 15 and the rear end by a rear end closure head 17. The space within the casing 13 and between the closure heads 15, 17 is designated generally as a chemaction chamber 19. For convenient reference herein, the right end of the engine, as viewed in FIG. 1, is designated the rear end; the left end of the engine as the front or forward end.

The casing 13 is made preferably of high tensile steel, but, of course, other suitable materials may be used. A layer of insulation 21 surrounds the exterior of both the casing 13 and the heads 15, 17, and a thin sheet of high tensile steel is placed over the insulation 21, thereby forming a protective jacket 23. The interior surface of both the casing 13 and the closure heads 15, 17 is covered with a layer of a suitable heat resistant ceramic material, preferably one that may be bonded to the steel surfaces. It will be recognized of course that other suitable heat resistant materials may be applied to the inner surfaces if desired. The front end closure head 15 is dished and is provided with an axial opening 27. An extension neck 29 is attached to the closure head 15, so as to be in axial alignment with the casing 13 and to merge with the closure 15 at the opening 27. The extension neck 29 is closed and sealed preferably by a steel plug 31 fixed therein, or it may be closed in any suitable manner using other appropriate materials. A plurality of passages are provided in the plug 31, in each of which there is a tube or pipe. Each tube or pipe will be identified and its function described hereinafter.

The rear end closure head 17 is generally similar to the front end closure 15. The closure head 17 has an axial opening 33 and an extension neck 35 which is attached to the closure 17 so as to be in axial alignment with the casing 13 and to merge with the closure 17 at the opening 33. The neck 35, which is a thrust outlet, has a generally cylindrical form, as shown in FIG. 1. In a preferred embodiment of the invention the diameter of the neck 35 is determined experimentally so that the engine 11 will develop the maximum overall efficiency.

Within the chemaction chamber 19, there are two sets of coils of tubing; a primary coil 37 and a secondary coil 39. The primary coil 37 is situated just slightly in front of the mid-length point of the casing 13 and the secondary coil 39 is situated just to the rear of the mid-length point of the casing 13. Each coil of tubing 37, 39 is conveniently supported at several points around the periphery of the casing 13 by a plurality of hangers 41, 43 and 45, 47. The hangers 41, 43 and 45, 47 are thin plates which are welded preferably to both the tubes and the casing wall, but, of course, any other suitable coil-supporting device may be used. The primary coil of tubing 37 is connected to an inlet tube 49 and an outlet tube 51, both of which extend through the casing 13 and beyond the jacket 23. The secondary coil of tubing 39 is connected both to an inlet tube 53 which extends through the casing 13 and beyond the jacket 23, and to an outlet tube 55. The outlet tube 55, however, extends within the casing 13 toward the front end closure head 15 and connects with one of the tubes extending through the plug 31, for a purpose that will be described hereinafter.

A mixing chamber 57, having a longitudinal axis parallel to the axis of the casing 13, is located within the chemaction chamber 19, preferably between the primary coil 37 and the plug 31. The mixing chamber 57 is a generally hollow cylindrical body having a hemispherical dished head 59 at the rearward end and a flattened dished head 61 at the front end. A tube 63, having its axis substantially parallel to the axis of the chamber 57, merges therewith and forms an outlet from the mixing chamber.

A hollow conical diffuser-igniter 65 is supported in a fixed location in the chemaction chamber 19 by a plurality of braces 67. The braces 67 are fixed to the diffuser-igniter 65 and to the wall of the casing 13 by welding, or in any other suitable manner. The axis of the diffuser-igniter 65 is aligned with the axis of the outlet tube 63 and the apex thereof is spaced slightly to the rear of the end of it. The diffuser-igniter 65 is made preferably of high tensile steel, or other suitable material, having an appropriate ceramic material bonded to its exterior surface. If desired, a high tensile heat resistant steel may also be used.

It was mentioned hereinbefore that a plurality of tubes enter the chemaction chamber 19 through passages in the plug 31. The tubes are received tightly and sealingly by each respective passage so as to prevent the escapement of gases from the chamber 19. One such tube 69 is disposed in an angularly sloping manner toward the axis of the mixing chamber 57. The end of the tube 69 nearest the chamber 57 is fitted with a starting nozzle 71. The nozzle 71 is located adjacent the end of the tube 63 for a purpose that will be explained hereinafter. The other end of the tube 69 extends from the plug 31 and joins a tube 73 of the power system, the purpose of which will be explained hereinafter. A high-tension type spark gap 75 is located within the tube 69 intermediately the plug 31 and the juncture of the tubes 69 and 73. The purpose of the spark gap will also be explained hereinafter. Another tube 77 extends through the plug 31 and the inner end of it is joined communicatively to the flattened dished head 61 of the mixing chamber 57. As mentioned previously, the tube 55 joins the tube 77 between the mixing chamber and the plug 31. Another tube 79, which is disposed in generally parallel spaced relation with respect to the tube 77, extends through the plug 31 and joins the tube 77 in the region of the juncture of the tubes 77 and 55. The purpose of the tubes 77, 79 will also be explained hereinafter.

A tube 81 encircles the outer surface of the casing 13 and is disposed in the insulating layer 21 close to the surface of the casing 13. This tube 81 has a plurality of fluid injection nozzles or orifices 83 which pierce both the casing 13 and the ceramic lining 25. The orifices 83 are so made that the amount of fluid passing each nozzle may be carefully regulated and controlled for a reason to be explained hereinafter. One end of the tube 81 is sealed (not shown) and the other end connects to apparatus of the power system. The axis of each nozzle 83 is directed angularly toward the region of the chemaction chamber 19 that is between the end of the outlet tube 63, focusing on the apex of the diffuser-igniter 65. The purpose of the tube 81 and the fluid injection nozzles 83 will be explained hereinafter.

The power system illustrated schematically in FIG. 2, includes a starting system and an auxiliary power system. The main power system is illustrated in FIG. 3.

The starting power system includes an air pump, PPA, four pressure tanks, ATA (air), ATB (basic fuel), ATC (water) and ATH (gasoline), a source of compressed air, the solenoid valves SV–1, SV–2, SV–8 and a spark gap, SG–1.

The auxiliary power system includes among other things a basic fuel pump, PPB; a water pump, PPC; and an oxygen pump, PPD. Each of these pumps is connected to a source of "Supply" and the discharge therefrom, including pump PPA, is connected via respective relief mechanisms PR1, PR2, PR3 and PR4 to the tanks ATA, ATB, ATC and PTD. Other equipment of the auxiliary power system includes a primary coil 37; a pressure actuated valve, PG–1; a heat regulated control valve, HCV–1; a pressure relief valve, PR–6; and a condenser, "Cond." The solenoid valves SV–3 and SV–4 are also included in the auxiliary power system. The auxiliary power system is, of course, a part of the overall power system and its function will be described hereinafter.

The main power system, as seen in FIG. 3, includes the secondary coil 39, a pressure relief mechanism, PR–5, the oxygen tank PTD, the solenoid valves SV–5 to SV–7 inclusive, and the tube 81 with its fluid injection nozzles 83. The function of the main power system will be described hereinafter.

FIG. 4 illustrates schematically the electrical controls for the power system of FIGS. 2 and 3. A main throttle is provided which includes a multi-position switch, SW–1. Other switches SW–2 to SW–5 inclusive are connected, for a purpose to be explained hereinafter, in circuitry with the solenoid valves SV–1 to SV–8 inclusive and the high-tension spark gap SG–1.

Now in order to describe the operation of the engine 11 reference is made to the figures of the drawing.

Prior to commencing operations which start the engine and bring it up to a desirable power level, it is necessary that there be available a supply of basic fuel, water, oxygen, gasoline and compressed air. The fuel which I designate as basic fuel and which I prefer to use in the engine of my invention is a quantity of a metal, in a finely divided or powdered form, mixed with a liquid hydrocarbon. The metal that I have selected is magnesium, although other suitable metals may be chosen from the activity list of metals. Magnesium is preferred, principally because it is readily available, it reacts desirably with steam or hot water to produce a great amount of heat, and it is less expensive than the other more active metals. It is readily appreciated that the metal should be in finely divided particle or powdered form because, in such form, more surface area is presented for reaction with other materials, as will be explained hereinafter. It is desirable to suspend the metal in a liquid hydrocarbon because both are compatible and there is no reaction between them. A hydrocarbon liquid is inert with respect to the metals of the activity list. Moreover, the hydrocarbon liquid is a satisfactory vehicle to carry the powdered fuel via the pump and tubing of the power system to the mixing chamber 57 as will be explained hereinafter. I prefer to use the liquid hydrocarbon kerosene because it is readily obtainable, inexpensive and combustible. Combustibility of the hydrocarbon liquid is a desirable property, the importance of which will be hereinafter pointed out.

In a preferred embodiment of my invention, the starting system exists separate and apart from the auxiliary and main power systems. The starting system is used only in starting and is not essential to sustain the operation of the engine, after it begins to generate thrust. In some applications, the units of the starting systems may be conveniently placed on a structure that can be moved from one location to another. This is particularly advantageous because a single starting system then may easily and readily serve more than one engine of my invention. Yet, in some other applications, it may be more desirable to incorporate the units of the starting system into the structure to which or within which the engine is attached.

Initially the normally-closed solenoid valves SV–1 to SV–8 inclusive are closed and a throttle lever 87 of the throttle switch SW–1 is in the off or zero position. Now, to commence operations, move the throttle lever 87 to position 1, and at the same time close switch SW–2 either manually, or in some other appropriate manner. The solenoid valve SV–8 opens and compressed air flows from the supply source, "Comp. Air Supp." to the tanks ATH (gasoline), ATB (basic fuel) and ATC (water). The gasoline and basic fuel are forced by the air pressure from the tanks ATH, ATB up to the solenoid valves SV–1 and SV–2. The water in tank ATC moves up to the heat controlled valve HC–1, which operates thermostatically under the influence of temperature.

The next step is to move the throttle lever 87 to position "2," which then causes the solenoid valves SV–1 and SV-2 to open; the valve SV-8 remaining open. Upon the opening of valves SV-1 and SV-2, gasoline flows in the tube 73 and air enters the tube 69. The quantities of gasoline and air are, of course, controllable so that an ignitable mixture results. When an ignitable mixture is present in the tube 69, voltage is impressed by any suitable means and manner across the spark gap SG-1 and the gasoline-air mixture is ignited and burns, a flame appearing and being maintained at the end of the starting nozzle 71 adjacent the tube 63. The flame at the starting nozzle 71 heats both the end of the tube 63, which is also the main nozzle, and the diffuser-igniter 65. It is desirable at this stage of the operating procedure to pause a few seconds to allow sufficient time for the flame to preheat the diffuser-igniter 65; whereupon the throttle lever 87 is moved to position "3."

With the throttle lever in position "3," the solenoid valves SV-1, SV-2 and SV-8 remain open; the flame at the starting nozzle continues to burn; and the solenoid valves SV-3, SV-4 now open. The basic fuel enters the tube 77 via SV-3 and air from the tank ATA enters the tube 79 via SV-4. The basic fuel and air enter the mixing chamber 57 and are thoroughly intermixed therein by virtue of the high-turbulent nature of the chamber 57. The basic fuel and air mixture emerge from the main nozzle 63 and are ignited by the starting nozzle flame and burn.

The flame of the basic fuel and air heats the primary and secondary coils 37, 39. As soon as the temperature in the primary coil 37 is high enough to cause water to flash into steam, the valve HCV-1 opens. A controllable amount of water then enters the primary coil 37 and immediately flashes into steam. The amount of steam will be regulated, preferably, by controlling the amount of water entering the coil. The steam pressure continues to build up until it reaches a predetermined pressure at which the valve PG-1 opens. Steam then flows via suitable tubing or pipes, shown diagrammatically in FIG. 2, to the inlet of each pump PPA, PPB, PPC and PPD. These pumps are, preferably, positive displacement pumps of the plunger and piston type, but other types may be found suitable. In some applications it may be desirable to include in the auxiliary power system a pressure relief mechanism, PR-6 and a condenser, "Cond." The mechanism PR-6 will bypass steam to the condenser, should the pressure in the steam line become excessive and the condenser, of course, recovers condensate and conserves the water supply. If desired, an electric-power turbo-generator may be incorporated in the auxiliary power system, as well as an air compressor, and other like equipment. It is to be clearly understood that the usual pressure regulators, safety valves, feedwater heaters and the like equipment are included in the auxiliary power system to make it completely functional. The steam now operates the pumps PPA, PPB, PPC and PPD to move basic fuel, water and oxygen from the respective supply sources, and air from the atmosphere, into the auxiliary and main power systems.

As soon as the pump PPA establishes sufficient air pressure in the tank ATA, the switch SW-2 may be opened. The solenoid valve SV-8 then closes and stops the flow of air from the compressed air supply source. The next step in the operating procedure, is to move the throttle lever 87 to position "4," and to close switch SW-3. It is evident that valves SV-1 and SV-2 remain open and the flame continues to burn at the starting nozzle 71. Valves SV-3 and SV-4 remain open and so the basic fuel and air continue to mix in the chamber 57 and burn at the main nozzle 63. Steam is being generated in the primary coil 37 and is being led to the pumps, which are working normally. The next step is to close switch SW-4.

Valve SV-5 opens to admit water into the secondary coil 39 and valve SV-6 opens to admit basic fuel into the tube 77. It will be readily understood that the flames at the nozzles 71 and 63 generate sufficient heat in the secondary coil 39 so that when water is admitted thereto via SV-5, the water immediately flashes into steam. The steam flows from the secondary coil 39 via tubes 55, 57 to the mixing chamber 57. As soon as a steady flow of steam is established, the switch SW-3 is opened and the valves SV-1 to SV-4 inclusive close. The flame at the starting nozzle 71 is extinguished and the burning mixture of air and basic fuel is also extinguished. However, the basic fuel is not cut off as it continues to flow via valve SV-6 into the mixing chamber 57. The steam and the basic fuel thereafter mix in the mixing chamber 57. The metal of the basic fuel reacts partially with the steam and the liquid hydrocarbon of the basic fuel is volatilized by the steam. Thereafter, the mixture of steam, metal, volatilized liquid hydrocarbon, and the products of the partial reaction emerge from the main nozzle and impinge upon the heated diffuser-igniter 65 which causes the steam to react completely with the metal of the basic fuel producing an oxide of the metal and hydrogen. In a preferred embodiment of my invention the metal is magnesium, and so magnesium oxide and hydrogen are formed. The steam reacts also with the volatilized liquid hydrocarbon; the oxygen of the steam combining with the carbon of the liquid hydrocarbon to form carbon monoxide and more hydrogen. It is quite evident that the engine is now generating power without an air supply. The power is developed by internal chemical reactions and the engine no longer needs nor depends on the starting air and gasoline system. Hence, it is desirable to be able to cut off the units of this system and in most cases remove them. This is particularly desirable whenever the engine is used to propel an object through the air or in space. It will be recognized that by removing the starting system there will be less nonuseable static weight which has to be propelled, and it is therefore possible to carry additional useable basic fuel or other materials.

The fact that magnesium reacts with steam to produce hydrogen and magnesium oxide is readily substantiated by reference to recognized texts concerning chemistry. A prepresentative reference text is "Fundamental Chemistry" by Horace G. Deming, published by John Wiley & Sons, Inc., New York, N.Y., 1940.

Now, at this stage in the operation of the engine, the metal of the basic fuel is reacting with the steam and is producing a metal oxide and hydrogen. The steam also is reacting with the liquid hydrocarbon and is producing carbon monoxide and hydrogen. The reaction of the metal and steam is exothermal, liberating great quantities of heat. The hot gases produced in the chamber 19 develop an internal pressure on the casing 13 and when the gases emerge therefrom via the axial opening 33 and neck 35, a forward thrust is developed.

It will be recognized that we now have an engine that is developing considerable thrust power and is operating without using air. The engine is, at this stage, a hydrogen generating machine. The engine, however, is not developing all of the power that may be obtained from it. For, I have found that the hydrogen may be combined with a small amount of oxygen to produce much more power than has been generated so far by the reaction of the basic fuel and steam, and the steam and the liquid hydrocarbon. Hydrogen readily combines with oxygen to produce water vapor and large quantities of heat. However, it is recognized that hydrogen and oxygen combine readily in a vigorous reaction, and that there is a danger of an explosion should too much oxygen be mixed at one time with the hydrogen. Accordingly, it is essential that the amount of oxygen entering the chamber 19 via the nozzles 83 be very carefully controlled and metered. It is clear, then, that by this means both the violence of the reaction and the power level of the engine are variably controlled.

The oxygen is normally stored at high pressure in a suitable container, "supply" of FIG. 2, and is led to the oxygen pump PPD via a pressure regulator (not shown). The oxygen then is pumped to the receiver tank PTD via a pressure relief mechanism PR–4 and from the tank PTD to the solenoid valve SV–7. It is desirable to inject the oxygen at or above the pressure within the chamber 19 and it is also essential to carefully meter the amount injected. Thus, the purpose of the fluid injection nozzles is to meter a variable controllable quantity of oxygen as explained. When it is desired to inject the oxygen into the chemaction chamber, the switch SW–5 is closed and the valve SV–7 opens allowing a variable controllable amount of oxygen to pass through the nozzles 83 into the chemaction chamber 19.

The reaction of the steam with the liquid hydrocarbon is endothermal and the reaction of the steam with the metal is exothermal. The net amount of heat generated by these simultaneous reactions is highly exothermal. The amount of heat may be determined by referring to recognized sources of information. Some typical sources are, "National Bureau of Standards, Circular 500" published by the National Bureau of Standards of the U.S. Department of Commerce; and "Flames, Their Structure, Radiation and Temperature," second edition, by authors Gaydon, A. G., and Wolfhard, H. G., published by Chapman & Hall, Ltd., London, 1960.

The gases produced by the reaction of the oxygen and hydrogen develop additional internal pressure within the casing 13. All of the gases emerging from the axial opening 33 and the extension neck 35 produce an internal imbalance of forces and a thrust tending to urge the engine in the forward direction. It will be clear that the size of the thrust opening 33, in some measure, controls the pressure developed. It is evident that, if the thrust opening is too small, the pressure in the chemaction chamber would build up excessively. So, too, if the thrust opening is too large, the pressure within the chamber would be reduced and the speed of the gases emerging therefrom would be reduced; both situations tending to reduce the forward thrust. Thus, it is desirable to select a size of thrust opening 33 which is compatible with the size of the chamber 19, so that the engine develops power at its maximum efficiency. In order to obtain as much thrust power as possible, the reactions must be complete. The casing 13 and the chemaction chamber 19 thereof should be large enough to contain and adequately compress the gases produced, yet not so large that it becomes too heavy for practical useful purposes. It is recognized that compression of the gases within the chemaction chamber has a tendency to create more heat. This, too, increases the efficiency of the engine.

It will be recognized now that the engine of my invention develops maximum power without depending on a supply of air. This fact is quite significant, for the reason that while the engine of my invention employs air for starting purposes, the engine rapidly reaches a power level at which it becomes self-sustaining and from which it climbs without using air. Thus, once started, the engine of my invention is capable of generating full power thrust at the higher levels of space, where there is no atmosphere.

It is apparent then that I have provided a jet engine: that represents a significant advancement over the prior art jet engines; that develops its maximum thrust power independently of an air supply; that develops its power from internal chemical reactions which do not require air.

While I have shown my invention in only one form, it will be obvious to those skilled in the art that it is not so limited, but is susceptible of various changes and modifications without departing from the spirit thereof.

I claim:

1. In a jet engine having a chemaction chamber wherein there is an exhaust passage, the method of producing power thrust comprising the steps of: injecting into said chemaction chamber powdered magnesium; injecting into said chemaction chamber steam to react with said magnesium and produce magnesium oxide and hydrogen; injecting into said chemaction chamber oxygen to react with said hydrogen and produce hot gases; and exhausting the gases resulting from said reaction via said exhaust passage to impart a thrust to said engine opposite to the direction of said emerging exhaust gases.

2. In a jet engine having a chemaction chamber wherein there is an exhaust passage, the method of producing power thrust comprising the steps of: injecting into said chemaction chamber fuel comprising a mixture of finely divided particles of magnesium and a liquid hydrocarbon; injecting into said chemaction chamber steam to react with said fuel and produce hydrogen and an oxide of said active metal; injecting into said chemaction chamber oxygen to react with said hydrogen and produce hot gases; and exhausting the gases resulting from said reaction via said exhaust passage to impart a thrust to said engine opposite to the direction of said emerging exhaust gases.

3. In a jet engine having a chemaction chamber wherein there is an exhaust passage, the method of producing power thrust comprising the steps of: injecting into said chemaction chamber fuel comprising a mixture of finely divided particles of magnesium and a liquid hydrocarbon; injecting into said chemaction chamber steam to mix with said fuel; raising the temperature of the mixture of said steam and fuel to accelerate a reaction thereof whereby hydrogen gas is produced; injecting into said chemaction chamber oxygen to react with said hydrogen and produce hot gases; and, exhausting the gases resulting from said reaction via said exhaust passage to impart a thrust to said engine opposite to the direction of said emerging exhaust gases.

4. In a jet engine having a chemaction chamber wherein there is an exhaust passage, the method of producing power thrust comprising the steps of: injecting into said chemaction chamber fuel comprising a mixture of an active metal and a liquid hydrocarbon, said active metal being selected from a group of metals which react with a form of water to produce hydrogen and an oxide of said metal; injecting into said chemaction chamber steam to react with said fuel and produce hydrogen and an oxide of said active metal; injecting into said chemaction chamber variable controllable amounts of oxygen to react with said hydrogen and produce hot gases; and exhausting the gases resulting from said reaction via said exhaust passage to impart a thrust to said engine opposite to the direction of said emerging exhaust gases.

5. In a jet engine having a chemaction chamber wherein there is an exhaust passage, the method of producing power thrust comprising the steps of: injecting into said chemaction chamber fuel comprising a mixture of finely divided particles of an active metal and a liquid hydrocarbon, said active metal being selected from a group of metals which react with a form of water to produce hydrogen and an oxide of said metal; injecting into said chemaction chamber steam to react with said fuel and produce hydrogen and an oxide of said active metal; injecting into said chemaction chamber oxygen to react with said hydrogen and produce hot gases; and exhausting the gases resulting from said reaction via said exhaust passage to impart a thrust to said engine opposite to the direction of said emerging exhaust gases.

6. In a jet engine having a chemaction chamber wherein there is an exhaust passage, the method of producing power thrust comprising the steps of: injecting into said chemaction chamber fuel comprising a mixture of finely divided particles of an active metal and a liquid hydrocarbon, said active metal being selected from a group of metals which react with a form of water to produce hydrogen and an oxide of said metal; injecting into said chemaction chamber steam to react with said fuel and produce hydrogen and an oxide of said active metal; raising the temperature of the mixture of said steam and fuel to accelerate a reaction thereof whereby hydrogen gas is produced; injecting into said chemaction chamber oxygen to react with said hydrogen and produce hot gases; and exhausting the gases resulting from said reaction via said exhaust passage to impart a thrust to said engine opposite to the direction of said emerging exhaust gases.

7. In a jet engine having a chemaction chamber wherein there is an exhaust passage, the method of producing power thrust comprising the steps of: injecting into an isolated environment within said chemaction chamber fuel comprising a mixture of finely divided particles of magnesium and a liquid hydrocarbon; injecting into said environment steam to mix with said fuel; raising the temperature of the mixture of said steam and fuel to accelerate a reaction thereof whereby hydrogen gas is produced; injecting into said chemaction chamber oxygen to react with said hydrogen and produce hot gases; utilizing said hot gases to generate said steam; and, exhausting the gases resulting from said reaction via said exhaust passage to impart a thrust to said engine opposite to the direction of said emerging exhaust gases.

8. In a jet engine having a chemaction chamber wherein there is an exhaust passage, the method of producing power thrust comprising the steps of: injecting into an isolated environment within said chemaction chamber fuel comprising a mixture of an active metal with a liquid hydrocarbon, said active metal being selected from a group of metals which react with a form of water to produce hydrogen and an oxide of said metal; injecting into said environment steam to react with said fuel and produce hydrogen and an oxide of said active metal; injecting into said chemaction chamber oxygen to react with said hydrogen and produce hot gases; utilizing hot said gases to generate said steam; and, exhausting the gases resulting from said reaction via said exhaust passage to impart a thrust to said engine opposite to the direction of said emerging exhaust gases.

References Cited in the file of this patent
UNITED STATES PATENTS
3,049,872    Johnson et al. _____ Aug. 21, 1962